Figure 1:
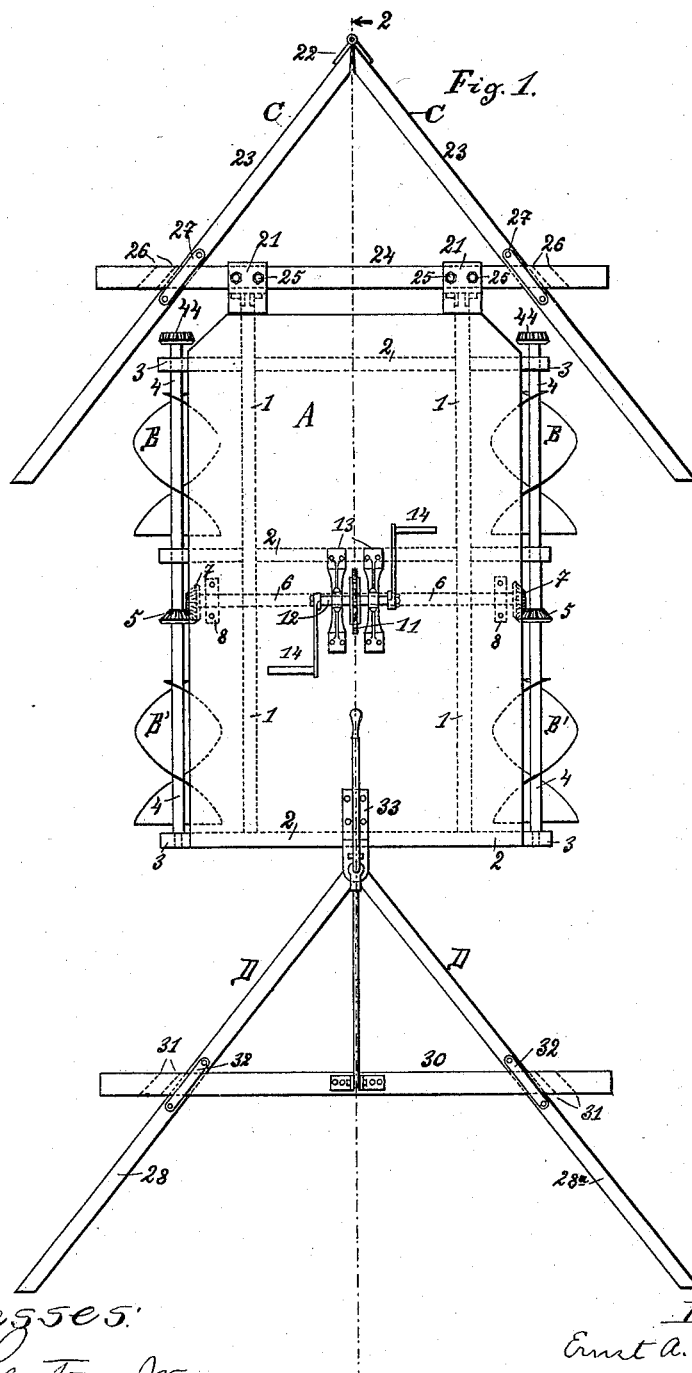

No. 647,095. Patented Apr. 10, 1900.
E. A. P. HENNIG.
MACHINE FOR CLEARING ICE SURFACES.
(Application filed June 6, 1899.)
(No Model.) 3 Sheets—Sheet 1.

Witnesses:
J. B. Peyton, Jr.
Thomas Durant

Inventor:
Ernst A. P. Hennig,
by Church & Church
Attorneys.

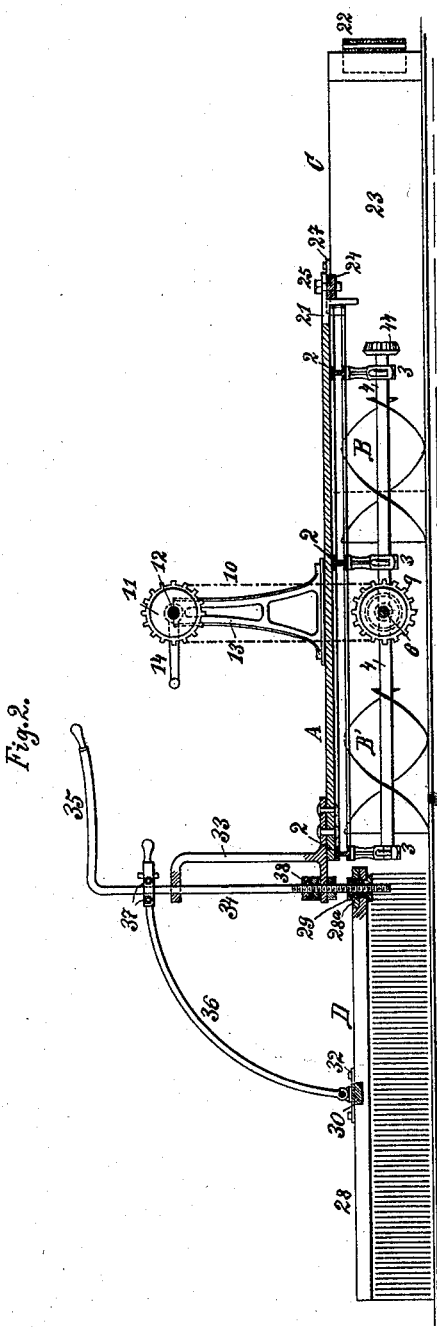

No. 647,095. Patented Apr. 10, 1900.
E. A. P. HENNIG.
MACHINE FOR CLEARING ICE SURFACES.
(Application filed June 6, 1899.)
(No Model.) 3 Sheets—Sheet 3.
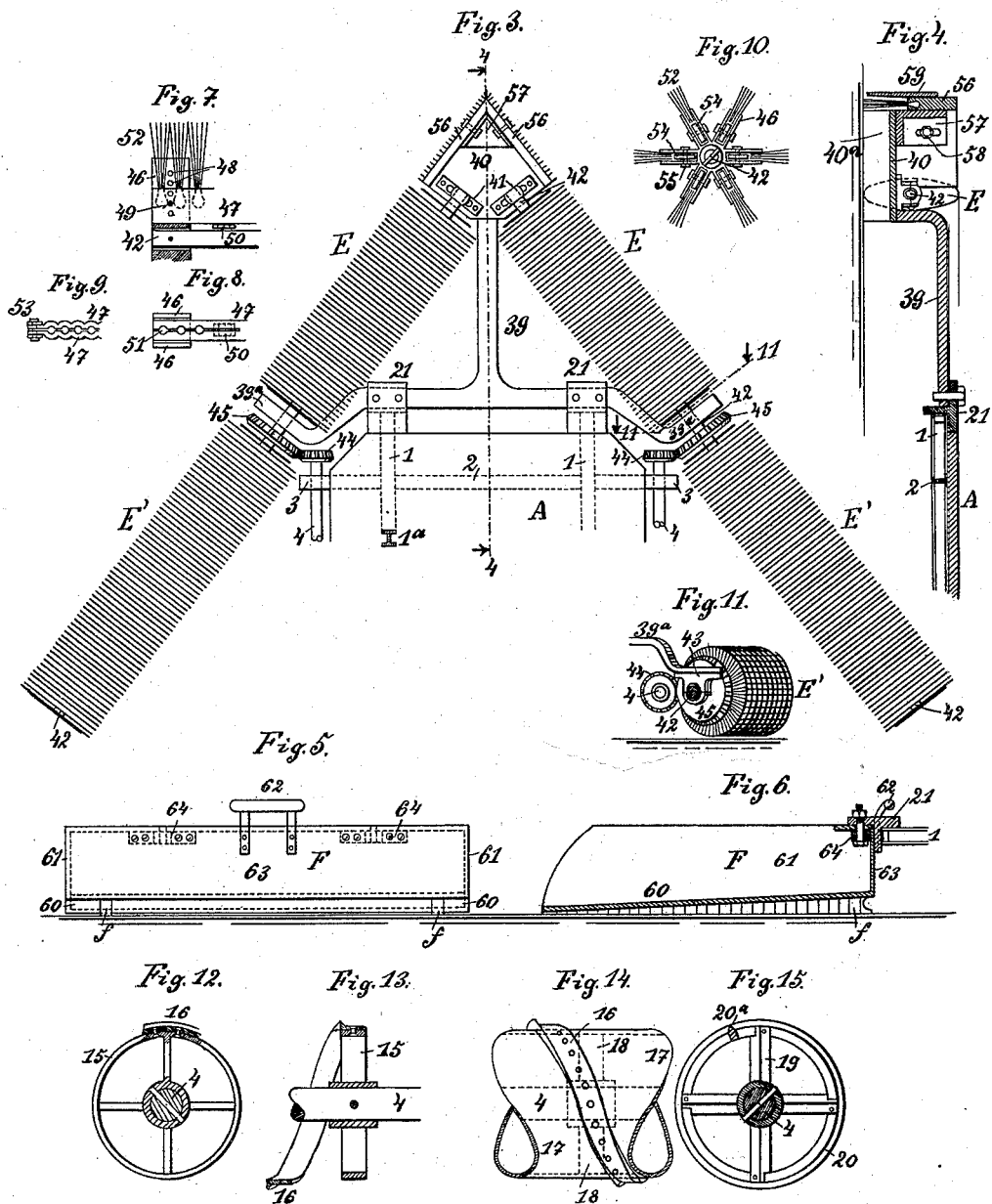
Witnesses:
J. B. Peyton, Jr.
Thomas Durant
Inventor
Ernst A. P. Hennig,
Church & Church
Attorneys

UNITED STATES PATENT OFFICE.

ERNST ALFRED PAUL HENNIG, OF DRESDEN, GERMANY.

MACHINE FOR CLEARING ICE SURFACES.

SPECIFICATION forming part of Letters Patent No. 647,095, dated April 10, 1900.

Application filed June 6, 1899. Serial No. 719,594. (No model.)

*To all whom it may concern:*

Be it known that I, ERNST ALFRED PAUL HENNIG, a subject of the King of Saxony, residing at Dresden, Saxony, Germany, have invented certain new and useful Improvements in or Relating to Machines for Clearing Ice Surfaces, (for which application for Letters Patent has been made in Germany, dated November 7, 1898,) of which the following is a specification.

The present invention relates to a machine constructed for the purpose of clearing ice surfaces (especially ice tracts or rinks for skating) from snow, dirt, or surface accumulations.

The machine is provided with removable and exchangeable devices so arranged that on the traveling platform or frame, according to requirements, either a snow-plow or brush-cylinder (such brush-cylinders as are used for street-cleaning) or a snow-shovel can be attached. Inasmuch as all these devices can easily be attached and are interchangeable with each other, the machine answers all purposes and can be employed for rapidly and easily cleaning ice surfaces of great extent under any of the usual conditions.

In the accompanying drawings, Figure 1 is a plan view of the whole machine provided with a snow-plow; Fig. 2, a vertical section on the line 2 2 of Fig. 1. Fig. 3 represents in plan the front part of the machine armed with brush-cylinders, Fig. 4, being a section on the line 4 4 of Fig. 3. Figs. 5 and 6 represent, respectively, a rear view and a vertical longitudinal section of the snow-plow. The other figures represent details. Figs. 7 and 8, 9, and 10 represent three modifications relating to the construction of the brush-cylinders. Fig. 11 is a section on the line 11 11 of Fig. 3. Figs. 12 and 13 and 14 and 15 represent different constructions of the screws or worms by means of which the machine is propelled on the ice.

The platform or frame A, Figs 1 to 4, consists of a plate strengthened by iron rails or bars or by wooden cross-pieces. The longitudinal bars 1 are preferably made of bars of I-shaped cross-section, as shown at I$^a$ in Fig. 3. The ends of the transverse supports 2 are provided with bearings 3 for shafts 4 of screws B B', which shafts are arranged parallel to the longitudinal supports of the platform. These shafts are turned by means of bevel-gears 5 and a transverse shaft 6, provided with the bevel-pinions 7, Fig. 1, at its ends. The shaft 6 rotates underneath the platform in bearing 8, Fig. 1. This shaft is provided in the center with a sprocket-wheel 9, Fig. 2, which is connected, by means of a driving-chain 10, with another sprocket-wheel 11. This wheel 11 is mounted on a short cross-shaft 12, which is carried above the platform, at a sufficient height to be worked by hand, in bearings of the frame 13 and provided with hand-cranks 14. The actuating-gear described may, however, be substituted by any other suitable operating means. Small machines may be worked by means of pedals, (like in a cycle,) in which case the shaft 12 would have to be arranged lower and the cranks 14 provided with pedals. Larger machines may be actuated by motors, which would be connected with the shaft 6 in any convenient manner in connection with this kind of gearing. The screws consist, as can be seen from Figs. 1 and 2, of two screws B B', separated, but arranged on the same shaft 4, so as to render it possible to arrange the central bearings 8 and the actuating-wheels 5 in a central position as regards the screw-axes. Under certain conditions, however, especially in the case of small machines, it would be sufficient to have a single screw on each side—say the front screw B. Instead of the second screws B' a slide-board or runner may be provided on each side of the platform.

Inasmuch as the screws when turning cut into the ice with their sharp edges like a screw in a nut, the platform is thereby moved forward in a straight line. The direction of movement depends upon the form of the screw-thread (whether right or left handed) and in the direction in which the screws turn. The screws are right hand on one side of the platform (on the right side in Fig. 1) and left hand on the other, and as the shafts 4 are turned in directions opposite to each other hence the screws will work against each other, producing a rectilineal forward movement. The screw-thread, as viewed in the direction of the axis, may be either full or broken. The latter is especially preferable when the thread is formed by a sheet-metal strip wound around the shaft like the screws or worm conveyers as used in moving—for instance, corn or flour in mills. Screws may also be cast in any of these forms. I prefer the screws to be hollow, as shown in Figs. 12 to 15, so that the strips or windings do not extend up to the central shaft, but leave an annular space, as seen in the direction of the axis, between the shaft and the screw. Screws of such a construction offer less resistance when moved through snow. It is further to be observed that the screws are not intended to remove the snow, but only to move forward the machine. Such hollow screws I construct either according to Figs. 12 (cross-section) and 13 (partly longitudinal section) or according to Fig. 14 (side view) or according to Fig. 15, (cross-section.) According to Figs. 12 and 13 disks, rings, or tube 15, comprising naves, spokes, and rim, are arranged at certain distances apart on the shaft 4, the bent metal strip forming the screw-thread, being connected at the required places to the rims over which they pass. This screw-rim, as clearly seen from the strip-section in Fig. 13, cuts into the ice. A similar strip 16 may be secured, as shown in Fig. 14, to form a screw-thread on a hollow cylinder 17, which hollow cylinder is supported on the shaft 4 by spokes 18. As shown in Fig. 15, arms 19, provided with slits or cut-away portions at their free ends, may be arranged on the shaft 4, into which recesses the strip of metal 20, serving as a screw-thread, is secured. The profile of this strip, as shown at 20$^a$, shows an outwardly-projecting edge, which cuts into the ice.

The parts of the longitudinal supports 1 projecting beyond the platform are provided in front with a T-shaped device 21, Figs. 1 and 2, or other suitably-shaped device, by means of which the different parts of the machine are attached to the platform.

The snow-plow C, Figs. 1 and 2, consists of two boards 23, connected together by a hinge-joint 22, the boards being connected by a cross-piece 24 and attached to the part 21 by screws or pins 25 only. When screws are used with a nut, they ought not to be too tightly set, but should allow the platform and snow-plow some little play as regards the relative height of one to the other, so that should any difference in height occur in course of work between the boards 23 and the platform the contact of the screws B B' with the surface of the ice will not be disturbed. The angle which the two boards 23 form with one another can be varied by inserting the upper edges of the boards 23 into one or other of a series of recesses 26, Fig. 1, cut laterally in the cross-piece 24 on the upper side of it and close together, the boards being secured in the recesses by screws and plates 27. At the rear of the platform are arranged two brushes D, arranged at an acute angle to each other, backs or wooden bars 28 and 28$^a$, in which the bristles, such as Piassava fiber, being connected at the front end, where they are cut away in thickness and superposed and clamped together by means of a rivet or socket 29, provided with a screw-thread. One of the brush-bars, 28, may be provided at its front end with bristles, but not the other, 28$^a$, because the latter is superposed on 28 at that point. The two bars are adjustably connected or stayed by a cross-bar 30, the latter being provided for this purpose with several recesses. The plates 32 are similar to those marked 27, which secure the boards 23, and in general the connection of the brush-bars is very similar to that of the snow-plow boards described above. The vertical rod 34, with the steering-handle 35, can be turned in the frame 33, Figs. 1 and 2. The bent rod 36, which is secured by means of screws to the rod 34 close to one of its ends, is connected by a hinge or pivot to the cross-bar 30 and serves as a stay for keeping the brushes 28 down in contact with the ground and causes also the same to partake in the movement of the lever 35. If, however, the screws 37, Fig. 2, are loosened, the socket 29, together with the brush-bars, may be raised or lowered by rotating the lever 35 in order to adjust the position of the brush relatively to the surface of the ice. In such case the rod 34, guided in the nuts 38, turns in a smooth guide-hole of the lower arm of the frame 33. If the nuts 38 are adjusted on the screw-threaded portion of rod 34, the height of the steering-lever 35 will be changed, by which means the said lever 35 can be arranged at the proper height for handling. After having adjusted it to the proper height the screws 37 are again firmly set. The snow having been removed by the snow-plow—i. e., the track having been cleared in a rough way by the snow-plow—the final clearing of the ice surface is carried out by means of the brushes D. At the same time the brushes D may also be used as a kind of steering gear or rudder, by means of which the direction of movement of the machine may be altered or controlled. If only this purpose is to be effected, the brushes may be substituted by any suitable device sliding on the surface, such as a board or steering-skate or a device similar in construction to the snow-plow. This arrangement of the brushes or steering device may, according to requirements, be also employed when the machine is supplied with a device other than a snow-plow.

The next devices to be described are those relating to the sweeping-cylinders, Figs. 3 and 4 and 7 to 11. When the cylinders are to be employed, the cross-pieces 24 of the snow-plow are removed from the parts 21, and in place of them a three-armed frame or support 39 is fastened in a similar way. The central arm of this device is provided at its free end with a horizontal plate 40, supported on the ice by a skate or shoe 40$^a$, which plate carries the front bearings 41 for the brush cylinder or roller shafts 42. The bearings 43, Fig. 11, supporting the other end of the shaft, are carried in suspension by the transverse bent frame-arms 39ª. The front ends of the screw-shafts 4 are provided with bevel-wheels 44, gearing with the similar wheels 45, fixed on the brush-cylinder shafts, by means of which the cylinders, each consisting, preferably, of two parts E and E', are rotated. These cylinders may be of similar construction to those used in ordinary street-cleaning machines. Inasmuch, however, as it is not desirable that the shaft-bearings should be made movable in the vertical direction, (as in the said street-cleaning machines, in which the cylinders are ungeared by raising them,) I prefer to construct the cylinders in a manner which enables me to counteract the wear and tear of the brushes by a radial displacement or movement of the bristles or brush portions. In the drawings several of such devices are represented. (See Figs. 7 to 10.) In the first construction, Figs. 7 and 8, the shaft 42 is provided with fork-shaped flat arms 46, as in Fig. 10, in which radially-movable bristle-holders 47, made in two parts, are secured and fixed in the position required by means of a pin 49, passing through one of a series of holes 48, Fig. 7, arranged at different distances from the center. The bristle-holders 47 can be opened when removed from 46, as their halves are connected by means of hinges 50. They are provided on the outside edges with holes 51, Fig. 8, which extend and are widened toward the center, so as to form pear-shaped hollow spaces, Fig. 7. Into these hollow spaces the bunches of bristles 52 are placed, with their thick ends fastened together by means of pitch or the like, and are then firmly held by clamping the two parts together. The construction represented in Fig. 9 is somewhat similar. Here also the bristle-holders 47 are made in two parts, but their ends are firmly held together by means of screws 53. The halves of the metallic bristle-holders represented in Fig. 9 show the arrangement of the hollow spaces also on the outside, the plates being undulating in shape. According to Fig. 10 the bunches of bristles 52 are held in holders or sticks 54 and are held in the fork-like arms 46, in which they can be adjusted by means of screws.

To avoid the brush-cylinders leaving a strip in the center of the track untouched, the free space at their forward adjacent ends is provided with two brushes 56, arranged at the same angles as the cylinders themselves. These brushes can be adjusted as to height by means of slots and clamping-screws 58, Fig. 4, on the angle-plate 57, fixed to the horizontal plate 40. In order to ease the work of these brushes in cases where greater masses of snow have to be removed, depending boards 59, Fig. 4, may be provided in front of them, which boards, however, need not reach to the surface of the ice. Small brushes or boards of a similar kind may also be provided on the frame-arms 39ª, so as to cover the spaces between the two parts E and E' of each brush-cylinder.

The third device in connection with the described machine is the snow-shovel F, Figs. 5 and 6. The shovel is of somewhat wide dimensions, so as to well cover the track, (breadth of the platform,) as well as a good length and depth, so as to be able to receive a great mass of snow or sweepings. The inclined bottom 60 of the shovel is supported on two skates or shoes $f$ and slides with its front edge on the surface of the ice, so as to scoop up the snow before it as the machine is moved forward. The sides 61 of the shovel prevent a lateral escape of the snow. The back 63, provided with a handle 62, is also provided with two flanges or plates 64, by means of which the shovel is fastened to the angle-irons 21 of the longitudinal supports 1 in a similar manner as the snow-plow or the brush-cylinder device is fastened.

The machine as described may also work with a fork-clearing device. The sweeping-brushes D, as described previously, may also be used in exactly the same manner as the snow-plow C, being fastened by means of the cross-piece 30 to the front part of the platform. In such case the smaller sweeping-brushes D may be retained at the rear of the machine for the purpose of finishing the sweeping and steering the machine, or any other contrivance may be used for steering the machine.

Of course many modifications may be made in the details of the machine without, however, interfering with the principle of the invention. The screw-shafts, as well as the brush-cylinders, may be made hollow for the purpose of saving weight.

I claim—

1. A machine for clearing ice surfaces comprising a platform with a driving device arranged on it actuating a driving-screw revoluble in bearings parallel to the direction of movement of the machine in combination with means for securing a clearing device to the forward part of the machine, substantially as described.

2. In a machine of the kind described a driving-screw having an annular hollow space between its supporting-shaft and its screw-surface, substantially as described.

3. In a machine of the kind described a driving-screw comprising rings 15 consisting of nave and a rim carried on a shaft with a screw-thread fixed to the rims of the said disks which screw-thread consists of a bent metal strip with a sharp edge on its outer side substantially as described.

4. In a machine of the kind described a steering device comprising a frame secured to the rear of the main frame a guide-frame 33 a rod rotatable and vertically adjustable in said frame and provided with a handle a screw-threaded socket engaging with the screw-threaded end of the rod and a bar as 36 connecting a cross-bar uniting the two boards to the steering-rod substantially as described.

5. In a machine of the kind described roller-brushes arranged on shafts at an angle with each other and converging forwardly toward the central axis of the machine a three-armed frame-support connected to the platform the lateral arms of which frame are provided with the bearings for the shafts of the roller-brushes the front arm carrying a vertical plate provided with a shoe which plate also carries the front bearings 41 for the shafts, toothed wheels on the shafts of the roller-brushes gearing with the toothed wheels on the driving-shafts substantially as described.

6. In an ice-vehicle, the combination with the main frame, of the screw-propellers located below said frame and upon which it rests and driving mechanism for said propellers; substantially as described.

7. In an ice-vehicle, the combination with the main frame, the screw-propeller upon which the frame is mounted, a steering device, and driving mechanism for the propellers; substantially as described.

8. In a machine such as described, the combination with the main frame, the brush-frame carried by said main frame, the brush-cylinder, the adjustable brush-holders carried by said cylinders, and the brushes mounted in said holders; substantially as described.

In testimony whereof I hereto set my hand in the presence of the two subscribing witnesses.

ERNST ALFRED PAUL HENNIG.

Witnesses:
OTTO WOLFF,
PAUL CARL VORBECK.